United States Patent Office 3,127,343
Patented Mar. 31, 1964

3,127,343
INVERT EMULSION WELL FLUID
William A. Reddie and Charles O. Bundrant, Houston, Tex., assignors to Magnet Cove Barium Corporation, Houston, Tex.
No Drawing. Filed July 28, 1960, Ser. No. 45,819
16 Claims. (Cl. 252—8.5)

This invention relates to improvements in invert emulsions useful in well operations. In one aspect, it is an improvement in a method for producing invert emulsions, in another aspect it relates to improved concentrated materials useful in the production of such emulsions and in still another of its aspects it relates to an improved process for conducting well operations.

In the drilling and treating of wells, invert emulsions frequently are used. For example, in rotary drilling of oil wells, completion of wells in oil or gas bearing sandstone strata, and in work-over of such wells, invert emulsions supply the solution to a great many problems. Penetration of hydratable shales is easily accomplished by the use of an invert emulsion drilling mud without difficulty due to hydration. Completion of a well in a gas or oil bearing sand which is easily damaged by water, can be accomplished safely with an invert emulsion type of drilling fluid, as these do not damage the productivity of a formation as an aqueous or oil-in-water emulsion type of mud frequently does. The use of invert emulsions in well completions also enables rapid and easy operation and will permit evaluation of the formation not only more quickly but more accurately.

In the work-over operation on many oil wells, aqueous drilling muds or muds of the oil-in-water type are not at all satisfactory. For example, work-over of wells of the Pennsylvanian Age Sands of Central Oklahoma often cannot be carried out successfully by the use of an aqueous drilling fluid. Water block of the fine pores of these sands may completely destroy the productivity of a well.

The use of oil base muds for well completion and work-over in locations where aqueous base muds cannot be used has been quite common, but oil base muds are quite expensive to prepare. A great deal of the cost of the drilling fluid may be saved by the use of an invert emulsion type of mud in which water phase is dispersed as an oil phase. The oil ordinarily used is crude oil, or one of the cheaper refined oils such as diesel oil. Many types of oils may be used but the lower priced oils are more practical.

An invert emulsion type of mud must have thermal stability up to at least 250 degrees F. to be practical for use in deep wells, and the invert emulsion must be compatible with the usual weighting materials suspended in the mud in quantities to give controllable densities up to about 18 pounds per gallon; it should have very low filter loss and any filtrate formed should consist only of oil; it must be resistant to contamination encountered in passing through salt or anhydrite strata; it should be easily prepared with equipment ordinarily present at a drilling rig and it should have satisfactory viscosity and gel strength whether prepared with salt water or fresh water.

It has been very difficult to prepare invert emulsions having all of the required properties; or to prepare concentrated materials for mixing with water and oil at a well site to yield an invert emulsion consistently having the above outlined properties. One of the greatest difficulties encountered results from the fact that invert emulsions frequently require a very high degree of shear for their preparation. Their production from concentrated emulsifying materials, oil and water is difficult using the mud machinery commonly available at a drilling rig.

It is an object of this invention to provide an invert emulsion well fluid which is easily formed by the use of equipment ordinarily present at a drilling rig and which does not require excessively high degree of shear for its formation.

Another object is to provide concentrated emulsifying materials which may be mixed with oil and water at a well head to provide a drilling fluid of desirable rheological properties without the necessity for special mixing equipment.

Another object is to provide an improved invert emulsion drilling fluid which is stable in the presence of hydratable clays and other earth solids.

Another object is to provide a well fluid of an invert emulsion type which is stable at temperatures above 250 degrees F. under high pressure.

Another object is to provide an improved invert emulsion drilling fluid which has very low fluid loss and which does not cause water block of oil bearing sands.

Another object is to provide an improved invert emulsion drilling fluid having high lubricity which results in a high rate of bit penetration and long life of bit bearings.

Another object is to provide two concentrated materials for use in forming invert emulsions; namely, a liquid concentrate for mixing with oil and a free flowing solid concentrate to complement the liquid concentrate in forming an invert emulsion well fluid.

Another object is to provide an improved process for the production of an invert emulsion type of well fluid.

Still another object is to provide an improved method for carrying out well operations in which water block of oil or gas bearing strata is prevented and hydration of clays and earth solids is largely eliminated.

Another object of the invention is to provide an invert emulsion well fluid which is stable in the presence of large proportions of salts such as sodium chloride, calcium sulfate, etc.

Another object is to provide a well fluid having low solids content combined with satisfactory rheological properties.

Another object is to provide a well fluid which does not penetrate formations being drilled to any substantial extent and which may be used in core drilling to recover cores substantially in native state.

Other objects, advantages and features are inherent to the invention and will become apparent upon a consideration of the written specification, and the claims, herein contained.

We have found that the ease of forming an invert emulsion, using a polymerized polybasic fatty acid pitch as a primary emulsifier, is greatly increased when an ethylene oxide adduct of pitch is used with the pitch in proportion from 5 to 75 percent, or preferably from 25 to 50 percent of the total quantity of untreated pitch and adduct. This adduct is prepared by adducting a polymerized polybasic fatty acid pitch with from 25 to 75 percent, preferably about 40 to 60 percent of its weight of ethylene oxide, by a well known reaction to be described later.

Although an invert emulsion is easily formed by the use of pitch and adduct, the solids supporting ability of the emulsion is very poor and addition of a basic magnesium compound in quantity to form magnesium soap by reaction in situ with the pitch, does not eliminate this disadvantage. However, we have found that the ease with which invert emulsions are formed by the use of pitch and adduct is retained, and the poor stability of solids is corrected when tall oil to the extent of about 0.05 to 0.1 of the total weight of pitch and adduct is added with or incorporated in a pitch-adduct mixture. Apparently the concentration of free fatty acids in the mixture is critical, and this proportion of tall oil furnishes sufficient free fatty acid to bring the fatty acid content of the pitch-adduct mixture into the critical range.

Also, we have found that small amounts of a mixture of attapulgite and a quaternary ammonium surfactant incorporated in these emulsions is especially effective for enhancing weight supporting power of the invert emulsions prepared by use of the pitch-adduct-tall oil mixture. We have found that an attapulgite-quaternary ammonium surfactant mixture, suitable for use in the emulsions, may be prepared by merely mixing the attapulgite and surfactant intimately, omitting the customary steps of suspending the attapulgite in water, settling out grit, acidifying the suspension, adding surfactant, drying the suspension, and grinding the resulting product.

The present invention contemplates the production of invert emulsion type of well fluids by incorporation of a polymerized polybasic fatty acid pitch, tall oil, and the ethylene oxide adduct of pitch in an oil base for a well fluid emulsion. We prefer to mix water and oil base containing these materials and to agitate the mixture until it is emulsified. A basic magnesium compound, selected from the group consisting of magnesium oxide, magnesium hydroxide and magnesium carbonate; and a mixture of attapulgite with quaternary ammonium surfactant, preferably prepared by intimately mixing the attapulgite and the surfactant as in a muller, are added as the emulsion forms. The above sequence of steps is usually found to be the most convenient, although addition of the ingredients to the emulsion may be carried out in any desired sequence. The quaternary ammonium surfactant, attapulgite and the magnesium compound are used in the preferred ratio of about 1 part by weight of quaternary ammonium surfactant to about 4 to 8 parts of attapulgite and about 10 to 20 parts of basic magnesium compound, magnesium oxide being the preferred basic magnesium compound. The total quantity of magnesium oxide used is at least sufficient to form magnesium soaps with all free fatty acids present in the polymerized polybasic fatty acid pitch-adduct-tall oil mixture.

This invention also contemplates the preparation of concentrated materials for use in forming invert emulsions. It is preferred that two types of concentrates be prepared for this purpose; namely, an oil soluble liquid containing the polymerized polybasic fatty acid pitch, the pitch-adduct and tall oil in a solvent, and a concentrated free-flowing powder containing the quaternary ammonium surfactant absorbed on the surface of the attapulgite mixed with magnesium oxide.

For example, the liquid concentrate may be prepared by mixing the desired portions of polymerized polybasic fatty acid pitch, adduct, tall oil, and a heavy aromatic naphtha or a fraction recovered by solvent refining of lubricating oil, in quantities sufficient to maintain the pitch, adduct and tall oil in solution.

One preferred formulation of such a liquid concentrate (hereinafter referred to as Concentrate A) is prepared as follows:

| Concentrate A— | Percent |
|---|---|
| Polymerized polybasic fatty acid pitch | 33 |
| Pitch-ethylene oxide adduct | 25 |
| Crude tall oil | 3 |
| Heavy aromatic naphtha | 39 |

These materials may be merely agitated until a solution results. The time required for solution may be reduced and uniformity of product is more easily attained by the use of moderate heat in preparation of the solution. A temperature in the range from 160 to 170 degrees F. is preferred for this use.

A preferred formulation for a free flowing powder for complementary use with Concentrate A (hereinafter referred to as Concentrate B) is prepared as follows:

| Concentrate B— | Percent |
|---|---|
| Quaternary ammonium surfactant* | 7 to 8 |
| Attapulgite (approximately) | 15 |
| Magnesium oxide (approximately) | 77 |

*50% solution in isopropyl alcohol.

The mixing of the materials to produce a free-flowing powder (Concentrate B) is best carried out by intimately mixing a quaternary ammonium surfactant with attapulgite, and adding the required amount of magnesium oxide. This operation is best conducted in a muller, although any similar device may be used which is capable of thoroughly mixing the materials. It is preferred that this material be passed through a light grinding step in order to eliminate lumps which may have formed during the mixing step. The resulting mixture is a dry, free-flowing powder which can be easily handled.

For making up an emulsion for well fluid use, we prefer to use the concentrates as set forth above in proportions depending upon the service for which the well fluid is to be used. The service may be divided roughly into three categories; mild service, medium service or severe service. The service classification depends primarily upon the degree of heat, the degree of contamination by salts and hydratable earth solids normally expected to be encountered, and the amount of weighting material to be suspended in the emulsion.

When the well fluid is to be used in mild service, it is preferred that about 15 to 20 pounds of the above Concentrate A per barrel of well fluid be used, and that about 1 to 5 pounds per barrel of well fluid of the Concentrate B be used. For medium service, it is preferred that the same proportion of Concentrate A be used and the proportion of Concentrate B be increased to about 6 to 12 pounds per barrel of finished fluid. When severe service is expected, we prefer to use from about 17 to 25 pounds of Concentrate A per barrel of well fluid and about 13 to 20 pounds per barrel of Concentrate B.

An emulsion prepared as described above, either by use of Concentrates A and B, or the ingredients thereof added separately or in other mixtures, is an excellent well fluid of low solids content and low density. Weighting materials, such as barium sulfate, lead sulfide, or iron oxide, may then be added to the emulsion to give the density desired. Invert emulsions prepared in this manner are capable of suspending weighting materials in quantities to give the finished well fluid densities up to 18 pounds per gallon or more if desired.

The ordinary aqueous well fluids, prepared by dispersion of clays, weighting materials and other conventional substances in water, can be used for the aqueous phase of the emulsion instead of clear water if desired. An aqueous drilling mud which has been used to drill down to a depth approaching that at which an oil-bearing sand is normally expected to lie, may thus be used in this emulsion, but it is preferred to use clear water to form the aqueous phase, because there is less settling when the emulsion is prepared before the weighting materials, clays, etc. are added.

The proportions of oil and water that may be used in the preparation of the well fluid of this invention are quite wide. The finished invert emulsion may contain from 10 to 90 percent by volume of water and from 90 to 10 percent of oil, but we prefer to use proportions within the ranges of 30 to 70 percent of water and 70 to 30 percent of oil. In most cases, it is preferable to keep the ranges of both water and oil within the limits of about 40 to 60 percent by volume since these limits permit the dilution of emulsion with either of the major constituents without severely upsetting the rheological properties of the emulsion.

The water used in preparing the invert emulsion may be of almost any type which is readily available at the drilling site or well location. It may contain small quantities of various salts, such as are found in the water supplies of most cities or in the water of rivers or lakes, and may even be saturated with sodium chloride. In fact, the desirable properties of these invert emulsions frequently are improved by the addition of sufficient salt to saturate the aqueous phase. Sea water, oil field brines or water containing substantial amounts of gypsum may also be used in this preparation.

As stated above, the quantity of water which can be used in the formation of an invert emulsion may be as high as 90 percent. However, as the water concentration exceeds 70 percent, the invert emulsion tends to become less stable and more prone to flip into an emulsion of an oil-in-water type. These emulsions also tend to be less stable to dilution by water entering the well from water-bearing strata penetrated. It is therefore often preferable that an upper limit of about 60 percent by volume of water be used in the emulsion. As the water content of the emulsion decreases below 30 percent, the viscosity and gel strength of the emulsion may also decrease to a point that it may be necessary to add gel strength and viscosity increasing materials, preferably water or oil of greater viscosity, to maintain desirable rheological properties in the emulsion.

The density desired in the invert emulsion will partially determine the particular water concentration to be used. As increased amounts of weighting materials are added, water concentration should be decreased to avoid excessive thickness of the fluid. Emulsions of water content in the range from about 40 to 60 percent, or even more desirable about 50 percent, will support large quantities of weighting materials and may be diluted with either water or oil from formations penetrated, without increasing or decreasing the water content to any undesirable extent.

Either refined or crude oils may be used as the oil phase of these emulsions. Such refined materials as diesel oil or fuel oil are substantially free from the lighter hydrocarbons and do not contain the de-emulsifiers which are frequently found in crude oils. It is preferred that the more inexpensive refined oils be used for this purpose.

The volume of oil used in these emulsions is that which is required to complement the volume of water set forth above. The oil proportion is simply the difference between the proportion of water expressed as volume percent and 100 percent.

The emulsions may contain about 5 to 10 pounds per barrel of polymerized polybasic fatty acid pitch, preferably about 5 to 8¼ pounds per barrel, together with about ½ to 15, preferably about 3 to 6½ pounds per barrel of an ethylene oxide adduct of pitch. The adduct is present in proportion amounting to 5 to 75 percent by weight, preferably 25 to 50 percent, of the total quantity of pitch and adduct. Tall oil is present to the extent of about 0.4 to 1.5, preferably about 0.4 to 0.75 pounds per barrel and in proportion of about 5 to 10 percent, preferably about 5 percent of the total weight of pitch and adduct.

A basic magnesium compound selected from the group consisting of magnesium oxide, magnesium hydroxide and magnesium carbonate, preferably magnesium oxide, is present to the extent of 0.75 to 30.0, preferably about 0.75 to 15.5 pounds per barrel, and in quantity at least sufficient to form magnesium soaps with the free fatty acids present. A quaternary ammonium surfactant, preferably selected from a group to be described later, in amounts from about 0.03 to 1.6, preferably about 0.035 to 0.8 pounds per barrel, adsorbed on about 0.15 to 6.0, preferably about 0.15 to 3.0 pounds of attapulgite per barrel is also present.

We have found that invert emulsions of this type have two remarkably enhanced advantageous properties, in addition to weight supporting power, viscosity and gel strength, desirable in well fluids. These two properties are high lubricity and such great stability under the conditions of shear and pressure encountered in actual drilling operations that there is substantially no penetration of fluid into a formation being drilled. For example, in actual core drilling operations on easily permeable strata, cores were recovered in substantially native state which enabled accurate determination of water content and composition of cores. In actual drilling operations high rates of bit penetration have been achieved, together with unusually long life of bits and bit bearings.

We do not know the exact reasons for the great enhancement of these two desirable properties, but assume that the high lubricity results from the presence in the fluid of grease forming materials such as magnesium soaps in particularly desirable proportions. Under the conditions of shear and pressure encountered in actual drilling operations, the penetration of fluid into the surrounding formation is less than that which might be expected from laboratory fluid loss determinations on samples of the freshly prepared emulsions.

The polymerized polybasic fatty acid pitch used in the emulsions can be described as a polybasic fatty acid polymer resulting from polymerization as by heat treatment, of unsaturated fatty acids which have from 12 to 24 carbon atoms per molecule. The resulting polybasic fatty acid polymer comprises at least 30 percent of either the dimers or trimers which have 24 to 28 or 36 to 72 carbon atoms per molecule, respectively, and are respectively di and tri basic.

Mixtures of dimers and trimers also can be used, such mixtures having polymers containing about 24 to 72 carbon atoms per molecule. Among the unsaturated fatty acids which may be polymerized by heat to provide the polymers for the emulsion linoleic, oleic, erucic, linolenic, isolinolenic, eleomargaric, and eleostearic acids, and mixtures thereof may be given as examples. While these polymers can be prepared from reasonably pure unsaturated fatty acids, or mixtures thereof, polymers prepared from pure acids are quite expensive and usually will not be used for economic reasons.

The starting materials for polybasic fatty acid polymers which are sufficiently cheap to permit their use in well fluids ordinarily comprise various natural vegetable and animal oils and fats which are rich in unsaturated acids, such as cottonseed oil, corn oil, soy bean oil, linseed oil, and tung and rape oils. These naturally occurring oils also contain a great many other materials such as sterols, hydrocarbons, alcohols, aldehydes, ketones and saturated fatty acids, in addition to the unsaturated fatty acids, but are characterized in that they contain more than 30 percent of unsaturated fatty acids having from 12 to 24 carbon atoms per molecule.

The term "polymerized polybasic fatty acid pitch" used throughout the specification and claims, will refer to polymerized polybasic fatty acid pitches derived from such naturally occurring materials, containing polymerized fatty acids in admixture with congeneric substances in such proportions that the polymers will constitute at least 30 percent of the mixture by weight. This mixture should be substantially free from or low in rosin acids, such as occur in tall oil, to avoid the known disadvantages of tall oil emulsions.

Because of ready availability and low cost, we prefer to use the polybasic fatty acid polymers in the form of a vegetable pitch or linseed pitch, the latter to be distinguished from linseed oil in that linseed oil is an ester and not a polymerized fatty acid. The vegetable pitches commonly available on the market and suitable for use in this invention are ordinarily known in the trade as "vegetable pitch," but might also be termed "vegetable oil fatty acid pitches." They are sticky, viscous, dark brown materials, usually produced from cottonseed, corn or soy bean oils. These pitches always contain other materials derived from the vegetable oil used as a starting material.

In one process for producing commercial vegetable pitches, a crude vegetable oil is treated with aqueous caustic solution to convert free fatty acids and glycerides of fatty acids into soap. The complete volume of reaction products, called raw soap stock, consists of soap, oil and non-glyceride materials. The raw soap stock is treated with sulfuric acid or other mineral acids to convert soaps into free fatty acids.

The product called acid soap stock, consists of fatty acids, oil and non-glyceride materials, and the term "oil" being used by the manufacturers to designate fatty acid triglycerides.

The vegetable oil, acid soap stock or a mixture of both, is passed through a high pressure continuous splitter. In the splitter, the materials are intimately mixed with water and steam at about 500 degrees F. and about 760 p.s.i. The water reacts with the glycerides to form free fatty acids and glycerine, which are separated. The resulting crude fatty acid fraction contains about 2 percent unsaponifiables, with about 4 percent of glycerides and about 94 percent of free fatty acids. This fraction is then fed into a continuous fractionating still where approximately 80 percent of the total material is distilled off overhead as fatty acids, while the remainder is continuously removed from the bottom of the still as stillbottom vegetable residue. The distillation usually is conducted under a pressure of about 2 to 50 mm. of mercury at temperature up to about 510 degrees F., with a small percent of steam being injected into the base of the distillation column used. The average time the residue is subjected to these conditions is about four hours. Cottonseed oil, corn oil, and soy bean oil, are the principal oils treated by this process. Either a mixture of these oils or any one of them may be used as a starting material in the process just described, and accordingly, the stillbottom residue will be derived from one or more of the oils. It is common practice to use a mixture of stillbottom residues of these oils as a feed material for the production of vegetable pitch, although a residue from any one or any combination of them can be fed separately to produce its corresponding pitch.

The various vegetable pitches are produced by further stripping the individual or the composite stillbottom vegetable residues in a pitch still under a pressure of about 2 to 5 mm. of mercury, and at a temperature of about 480 degrees F. for approximately eight hours. This stripping is continued for removal of the lighter overhead products until the pitch or stillbottom has the desired specifications. It is quite common to produce vegetable pitches having a viscosity of 9 to 19 seconds at a temperature of 165 degrees C. in a Zahn G–5 cup. A lighter pitch may be obtained by stopping stripping while the stillbottom products have a viscosity of about 8.5 to 10 seconds at a temperature of 125 degrees C. in a Zahn G–5 cup.

Since corn, cottonseed and soy bean oils contain relatively large portions of unsaturated fatty acids, and these fatty acids are known to polymerize under prolonged heating, still residues, as described above, will contain 30 percent or more of polybasic fatty acid polymers.

Other methods are known for polymerizing unsaturated fatty acids, such as heating the original oils in the presence of a catalyst, air blowing the oils, or heating the oils without a catalyst; all of such methods being well known to those skilled in the art.

A vegetable pitch may be produced by any of the above polymerizing methods, and the invention is not limited to any one particular type of vegetable pitch. One type of vegetable pitch suitable for use in this invention is sold on the market with following specifications:

| | |
|---|---|
| Unsaponifiable matter | 15%. |
| Softening point, ball and ring | 55° C. |
| Acid value | 55 (45–65). |
| Saponification value | 130 (120–135). |
| Iodine value | 80 (70–90). |
| Color (Barrett) | 18. |
| Free fatty acids | 27% minimum. |
| Triglycerides, anhydrides and lactones | 40% minimum. |

This table is given merely as an example of one commercially available vegetable pitch useable in our emulsions. In general, it may be stated that any vegetable pitch or polymerized polybasic fatty acid pitch which contains at least 30 percent of polymerized polybasic fatty acids, and has an acid value of at least 23 percent may be used in this emulsion. Pitches having a free fatty acid content of about 26 to 28 percent are readily available on the market.

Many vegetable oils, other than corn, cottonseed or soy bean oils, can be treated by the process as outlined above to give a vegetable pitch which is useable in this invention. A linseed pitch may be made by treating linseed oil in the manner described above, or linseed oil could be mixed with any of the vegetable oils to give a vegetable pitch which would be suitable for use in this process.

The amount of the polymerized polybasic fatty acid pitch used in forming invert emulsions of the present invention will be dependent upon several factors. As for example, when the water content of the finished emulsion is increased, or when the quantity of the weighting materials to be added is increased, it is usually desirable to increase the amount of pitch and pitch-adduct.

The vegetable pitch-adduct used with this process is made by adducting a vegetable pitch as described above, with about ¼ to ¾ (preferably about ½) its weight of ethylene oxide, in a conventional manner.

In this process, a vegetable pitch or other polymerized polybasic fatty acid pitch is dissolved in a sufficient quantity of suitable solvent to render it fluid. Heavy aromatic naphthas are suitable solvents for use in the reaction. The pitch solution is introduced into an autoclave or other suitable pressure vessel, and the desired amount of ethylene oxide is run in. The reaction mixture is agitated at elevated temperature and pressure until reaction is complete.

In the resulting adduct, the ethylene oxide is added to the oil soluble fatty acid molecule in the form of chains, such as $-O-(CH_2-CH-O)_n-H$. The effect of these side chains of ethylene oxide is to render the insoluble heavy molecules of polymerized fatty acid at least partially water soluble. These adducts presumably contain ethylene oxide chains united to the carbon chain through ether linkages. Other materials present in the vegetable pitch may also enter into this reaction and take up a part of the ethylene oxide.

Since the exact composition of each of these pitches is variable and unknown, the composition of the product also is variable and unknown and the adduct can be defined only by its method of manufacture. The adduction of the vegetable pitches with about ¼ to ¾, preferably about 40 to 60 percent of their weight of ethylene oxide gives the desired properties of solubility and emulsifying power. The use of adduct with vegetable pitch as a primary emulsifier adds spontaneity and ease of emulsification.

Another material used in the preparation of these emulsions is the common crude tall oil of commerce. Tall oil, in admixture with vegetable pitch and vegetable pitch adduct in proportions of about 5 to 10 percent, preferably about 5 percent of total weight of pitch and adduct, will enable the suspension of large quantities of solids in the emulsion.

The quaternary ammonium surfactants used in these emulsions are quaternary ammonium salts derived from long chain fatty acids preferably having from 8 to 18 carbon atoms in the fatty acid chain. The term "quaternary ammonium surfactant" is used in a limited sense in this specification to mean a salt of a tetra alkyl substituted ammonium radical in which at least one of the alkyl groups is a hydrocarbon residue of a fatty acid having from 8 to 18 carbon atoms per molecule. Such quaternary ammonium salts may be prepared by reacting any suitable acid, such as acetic, hydrochloric, sulfuric, oxalic and adipic acids, with a long chain fatty acid amine, or by reacting a long chain fatty acid amine with methyl chloride and treating the product with an alkali hydroxide.

A preferred group of quaternary ammonium surfactant which is readily available on the market consists of lauryl trimethyl ammonium chloride; palmityl trimethyl ammonium chloride; coco trimethyl ammonium chloride, which is a mixture of quaternary ammonium chlorides derived from coconut oil fatty acids containing 8 to 18 atoms in the carbon chain in which $C_{12}$ fatty acids predominate; monotallow trimethyl ammonium chloride in which the fatty acid chains contain approximately 70 percent of $C_{18}$ fatty acids and 30 percent of $C_{16}$, and have an average molecular weight of about 364; dicoco dimethyl ammonium chloride derived from fatty acids normally present in coconut oil, having fatty acid chains containing from 8 to 18 carbon atoms with $C_{12}$ fatty acids predominating and an average molecular weight of about 432; dihydrogenated tallow dimethyl ammonium chloride which contains about 70 percent of $C_{18}$ and about 30 percent of $C_{16}$ fatty acids, with an average molecular weight of about 570; tricaprylyl monomethyl ammonium chloride which is sold commercially with carbon chains from $C_8$ to $C_{10}$, with $C_8$ acids predominating, and of average molecular weight of about 442; myristyl trimethyl ammonium chloride; oleyl-lineoleyl trimethyl ammonium chloride; stearyl trimethyl ammonium chloride; dimyristyl dimethyl ammonium chloride; and distearyl ammonium chloride.

An especially preferred quaternary ammonium subfactant of the above group is coco trimethyl ammonium chloride, since the combination of this material with a small amount of attapulgite usually gives the highest degree of weight supporting power to the emulsion.

While the specific quaternary ammonium surfactants given as examples above are all methyl, dimethyl or trimethyl ammonium chlorides, it is not intended to limit this invention to these particular materials. One or more ethyl groups may be substituted for one or more methyl groups, or more than one fatty acid chain may be present in the quaternary ammonium surfactant. The specific examples given above refer merely to materials which are now easily available on the open market.

The magnesium oxide used in this concentrate may be of any finely powdered material commonly available on the market, but we have found that a synthetic magnesium oxide having a bulk density of a range from 20 to 25 pounds per cubic foot and an iodine value in the range from 1 to 14, gave somewhat superior results when used in this concentrate.

In the preparation of our emulsions, we prefer to add from about 5 to 8¼ pounds of a vegetable pitch and about 3 to 6¼ pounds of vegetable pitch adduct with about 0.4 to 0.75 pound of tall oil per barrel of finished solution to the oil to be used therein. These ingredients may be added in any order, but it is preferred to add them as described in Concentrate A, or similar concentrate, for ease in operation. The oil used in this preparation is a petroleum oil, preferably diesel or fuel oil, but crude oil may be used if desired. The oil and water are then agitated until an emulsion is at least partially formed.

The preferred preparation further contemplates the addition of about 0.034 to 0.4 pound of cationic surfactant per barrel of finished emulsion, adsorbed on about 0.15 to 3 pounds of attapulgite in admixture with about ¾ to 15½ pounds of magnesium oxide, preferably added as described in Concentrate B, after the emulsion begins to form although it is possible to add the materials to the emulsion at any desired time.

We prefer to control the quantities of emulsifying and stabilizing materials within the range given above according to the severity of conditions expected in the particular well operation in which the emulsion is to be used. When the conditions are expected to be mild, we prefer to prepare an emulsion using the following formulation:

| | Lb./bbl. |
|---|---|
| Pitch | 5 to 6.66 |
| Pitch-ethylene oxide adduct | 3.75 to 5.0 |
| Tall oil | 0.45 to 0.2 |
| Quaternary ammonium surfactant | 0.035 to 0.2 |
| Attapulgite (approx.) | 0.15 to 0.8 |
| Magnesium oxide (approx.) | 0.77 to 4.0 |

When conditions of medium severity are expected, the preferred formulation will include:

| | Lb./bbl. |
|---|---|
| Pitch | 5.0 to 6.66 |
| Tall oil | 0.43 to 0.59 |
| Adduct | 3.75 to 5.0 |
| Quaternary ammonium surfactant | 0.2 to 0.4 |
| Attapulgite | 0.8 to 1.8 |
| Magnesium oxide | 4.0 to 9.25 |

For use under severe conditions of heat, contamination by salts or earth solids, and heavy loading with weighting materials, we prefer to prepare an emulsion containing the formulation as follows:

| | Lb./bbl. |
|---|---|
| Pitch | 5.6 to 8.25 |
| Tall oil | 0.54 to 0.75 |
| Adduct | 4.25 to 6.25 |
| Quaternary ammonium surfactant | 0.4 to 0.75 |
| Attapulgite | 1.8 to 3.0 |
| Magnesium oxide | 9.25 to 15.5 |

In all cases, we prefer to mix the quaternary ammonium surfactant intimately with dry attapulgite prior to introducing them into the emulsion or mixture. We have found that such mixing results in sufficient adsorption of the surfactant on the attapulgite to enhance the weight supporting power of these emulsions greatly, although the surfactant and attapulgite are ineffective for such use in other emulsions when merely mixed dry.

For use when a heaving shale, salt bed, or stratum of easily hydratable material is to be penetrated, a saturated salt water is preferred, although any type of water which is readily available is useable in the emulsion. Weighting materials may be added to give any required density. These weighting materials may be either barium sulfate, lead sulfide or iron oxide, as desired.

These emulsions are excellent high pressure lubricants, and high rates of bit penetration with long life of bit bearings are obtained in wells drilled with the use of this fluid. Heaving shale and other strata of easily hydratable earth solids are easily penetrated, and penetration of beds of salt or anhydrite has substantially no effect upon the properties of the emulsion. These emulsions will also remain stable at extreme pressures and at temperatures well in excess of 250 degrees F.

The following examples are submitted to illustrate specific cases of preparation and use of the emulsions and concentrated materials of this invention and to show the effect of process variables upon the emulsions and concentrates.

EXAMPLE I.—MANUFACTURE OF CONCENTRATED PITCH-ADDUCT-TALL OIL SOLUTION

To separate batches of solution were prepared containing 75 percent of a cottonseed pitch, designated as HCSP in the following table, and 25 percent of a heavy aromatic naphtha designated in the table as "Exosol." The free fatty acid content was about 26.1 percent, as oleic acid. Each of these batches contained 365 gallons.

Both batches were then adducted with ethylene oxide in the presence of small amounts of potassium hydroxide according to the process described above.

The following table is a material balance of the adduction reaction, in which the tank compartments, designated as front and back, each originally contained a 365-gallon batch of the pitch-solvent mixture.

*Table No. 1*

[Pounds of material]

| Tank compartment | HCSP | Exosol | EtO | KOH | Total | Ratio of HCSP EtO |
|---|---|---|---|---|---|---|
| Input: | | | | | | |
| Front | 2,220 | 740 | | | 2,960 | |
| Back | 2,220 | 740 | | | 2,960 | |
| Total | 4,440 | 1,480 | | | 5,920 | |
| Output: | | | | | | |
| Front | [1] 2,137 | 713 | 1,034 | 6 | 3,890 | 1.0:0.49 |
| Back | 2,182 | 728 | 1,142 | 8 | 4,060 | 1.0:0.52 |
| Total | 4,319 | 1,441 | 2,176 | 14 | 7,950 | |
| Loss | 121 | 39 | 160 | | | |
| Percent loss | 2.72 | 2.63 | 2.70 | | | |

[1] This tank was not level and sloped away from drain. Tank was cleaned out before HCSP-EtO adduct run in. This undoubtedly accounted for most of the loss reported above.

The total product of the two batches of adduct was used to prepare a pitch-adduct-tall oil concentrate for use in preparation of invert emulsions.

The same heavy aromatic naphtha was used as solvent, and the pitch, adduct and tall oil were dissolved in the naphtha at a temperature between 160 and 170 degrees F. No difficulties were encountered in obtaining solution of the pitch, adduct and tall oil in the naphtha under these conditions. The following table is a material balance on the preparation of this concentrate.

*Table No. 2*

| | Percent by wt. of total formula | Pounds | Gallons (approx.) |
|---|---|---|---|
| Input, material: | | | |
| Exosol | 33.5 | 8,720 | 1,130 |
| Tall oil | 3.0 | 780 | 96 |
| HCSP-EtO adduct | 30.5 | 7,950 | 940 |
| HCSP | 33.0 | 8,580 | [1] 1,073 |
| Total | | 26,030 | 3,239 |
| Output: | | | |
| Fifty-nine 55 gal. drums at 440 pounds net | | 25,960 | 3,210 |
| Pounds unaccounted for [2] | | 70 | |

[1] Volume hot.
[2] Actually a few gallons placed in 60th drum.
NOTE.—Concentrate A weighed approximately 8.1 lbs./gal.

EXAMPLE II

An emulsion prepared from the Concentrate A and B given in the foregoing, was used under very adverse conditions in taking cores and completing a well. This well was drilled in porous formations where several hundred barrels of lost circulation were anticipated and the apparatus comprised a single gin pole rig; one 6×12 inch pump capable of running either the gun (mud-mixing jet) or the hole, at 450 to 500 pounds per sq. inch, but not both; no shale shaker; and a calciche settling pit that could take only about 200 barrels of mud.

Under these conditions, it was decided to drill 1,550 feet to within about 100 feet of the potential production zone with a water base mud and then replace the aqueous well fluid with an invert emulsion of our invention, drill to a point near that at which the upper edge of the pay zone was expected to be encountered, and core drill with the emulsion for 50 additional feet.

At a depth of 1,550 feet, the mud pits were jetted and cleaned out. Sixty barrels of water and 60 bags of salt were added and the salt content was checked at 317,000 parts per million. One hundred twenty barrels of 20 to 21 gravity crude oil was added to overlay the salt water.

Eight 55-gallon drums (about 3,400 pounds) of Concentrate A were added to the oil. The mixing gun was started while the 8th drum of Concentrate A was being added. The pump suction was arranged to pick up salt water from the bottom of the pit and the gun was set to drive oil down into the salt water. The emulsion quickly began to form and twenty 50-pound sacks of Concentrate B were added slowly through a hopper. An invert emulsion formed readily and when freshly prepared, had an electrical stability of 220, a funnel viscosity of 120 at one end of the pit and 180 at the other end, and a fluid loss of 1.5 cc. (oil only).

Drilling was resumed using this invert emulsion as well fluid and after 30 feet of drilling, the emulsion was found to be improved. It now had electrical stability of 300, funnel viscosity of 180 seconds and a fluid loss of 1.2 cc. (oil only). Four more bags of Concentrate B were then added. After thirty feet of additional drilling, the stability was 500, the funnel viscosity was 200 and the fluid loss was 1.2 cc. (oil only).

After drilling 100 feet with the invert emulsion, a trip was made and the bit was replaced by an 18 foot conventional core barrel, and cores were cut. The upper part of the first core was shale and the lower part was found to be an oil-sand (upper-Mirando). A second core was then cut and recovered, and was found to consist of both upper and lower Mirando sands, with a hard limestone streak in the middle of the core. A third core was cut and recovered. This core was found to be all sand, but the bottom part of the core was a hard water sand.

Gamma ray, neutron and induction logs were run and pipe was set with no difficulties encountered in completion of the well.

It was obvious that penetration of the emulsion into the cores was negligible. The cores were sent to an independent core testing laboratory for examination and the laboratory reported that for the first time it was able to arrive at a correct value for the water content of the Mirando sand; a value it had not been able to determine with any drilling fluid previously used.

EXAMPLE III

In order to determine the effect of varying the proportions of pitch and ethylene oxide in pitch-ethylene oxide-adduct, used in Concentrate A, several pitch-adducts were prepared using from ¼ to 2 parts of ethylene oxide per part of pitch by weight, and each adduct was used in the formula for Concentrate A given above. Eighteen pounds per barrel of Concentrate A containing 25 percent of each of the various pitch-ethylene oxide-adducts and 9 pounds per barrel of Concentrate B, were added to the preparation of a series of emulsions, and the properties of these emulsions were determined. The emulsions contained equal volumes of diesel oil and saturated salt water. The following results were obtained:

*Table No. 3*

| Ratio of pitch to EtO in formula | 1:0.25 | 1:0.5 | 1:0.75 | 1:1.1 | 1:2.0 | 1:3.0 |
|---|---|---|---|---|---|---|
| Stabilities, minutes: | | | | | | |
| 5 | 120 | 120 | 120 | 60 | 30 | 30 |
| 10 | 180 | 150 | 150 | 60 | 30 | 30 |
| 25 | 240 | 270 | 180 | 60 | 30 | 30 |
| Apparent viscosity | 57 | 57 | 63 | 46 | | |
| Gel strengths (0'/10') | 33/46 | 32/80 | 49/37 | 20/15 | | |
| Weighted to 12 lb/gal: | | | | | | |
| Stability | 240 | 270 | 240 | 90 | | |
| Apparent viscosity | 88 | 84 | 98 | 81 | | |
| Gel strengths (0'/10') | 40/92 | 38/87 | 57/80 | 32/23 | | |
| Added 25 lb/bbl. bentonite: | | | | | | |
| Stability | 210 | 210 | 210 | 180 | | |
| Apparent viscosity | 108 | 101 | 112 | 150 | | |
| Gel strengths (0'/10') | 42/99 | 32/90 | 41/75 | 55/40 | | |
| Aged static 16 hrs. at 250° F.: | | | | | | |
| Stability | 120/180 | 60/300 | 90/270 | 30/300 | | |
| Apparent viscosity | 116 | 112 | 140 | 88 | | |
| Gel strengths (0'/10') | 33/69 | 38/99 | 44/98 | 18/54 | | |
| Oil breakout, cc | 10 | 15 | 10 | 15 | | |

| Concentrate A: | Percent |
|---|---|
| Pitch:EtO adduct | 25 |
| Humko cottonseed pitch | 33 |
| Tall oil | 3 |
| Mobilsol-K | 10 |
| Exosol | 29 |

EXAMPLE IV

The effect of varying the ratio of vegetable pitch to pitch adduct, made by adducting one part of pitch with one half part per weight of ethylene oxide, in the formula of Concentrate A, above, was determined by preparing emulsions from equal quantities of diesel oil and saturated salt water. Each emulsion contained the equivalent of 11 pounds of vegetable pitch plus pitch adduct, and 6 pounds of Concentrate B per barrel. The following results were obtained:

*Table No. 4*

[Ratio of HCSP:EtO (1:½)]

| | 100-0 | 80-20 | 60-40 | 40-60 | 20-80 | 0-100 |
|---|---|---|---|---|---|---|
| Base Emulsion: | | | | | | |
| Stability— | | | | | | |
| 5 min | 60 | 100 | 110 | 150 | 180 | 210 |
| 10 min | 70 | 110 | 120 | 150 | | 240 |
| 25 min | 110 | 150 | 180 | 210 | 300 | 300 |
| Apparent viscosity | 38 | 54 | 52 | 78 | 105 | 108 |
| Gel strengths (0'/10') | 2/3 | 27/45 | 30/40 | 60/70 | 90/115 | 88/95 |
| Weighted to 12 lb/gal.: | | | | | | |
| Stability | 150 | 270 | 270 | 360 | 270 | (¹) |
| Apparent viscosity | 69 | 80 | 82 | 112 | 150+ | |
| Gel strengths (0'/10') | 2/6 | 25/70 | 35/58 | 83/100 | 180/180 | |
| Added 25 lb./bbl bentonite: | | | | | | |
| Stability | 150 | 270 | 270 | 300 | 240 | |
| Apparent viscosity | 82 | 99 | 94 | 128 | 150+ | |
| Gel strengths (0'/10') | 3/4 | 23/33 | 28/35 | 65/77 | 121/186 | |
| Aged static 16 hrs. at 250° F.: | | | | | | |
| Stability | 150/150 | 40/130 | 120/240 | 60/330 | 240/300 | |
| Apparent viscosity | 77 | 90 | 102 | 123 | 120 | |
| Gel strengths (0'/10') | 7/10 | 20/34 | 37/59 | 65/85 | 63/108 | |
| Fluid loss, cc. oil (30 minutes) | 0.2 | 1.4 | 1.8 | 2.0 | 2.2 | |

¹ Inverted.

EXAMPLE V

The properties of three cottonseed vegetable pitches were determined before and after adducting them with ethylene oxide in various proportions. It was found that adduction changed the properties of the pitch as shown by the following table:

*Table No. 5*

| | | After adducting with ethylene oxide in weight ratio of 1 part pitch to ½ part EtO ¹ |
|---|---|---|
| Pitch No. 1: | | |
| Free fatty acid (as oleic), percent | 33.1 | 0.0 |
| Acid value | 24.2 | 0.7 |
| Saponification number | 112.2 | 106.9 |
| Unsaponifiable, percent | 24.5 | 17.8 |
| Iodine value | 103.4 | 75.0 |

| | | After adducting with ethylene oxide in weight ratios of pitch: EtO ¹ | | | |
|---|---|---|---|---|---|
| | | 1:0:25 | 0:0.5 | 0:0.75 | 0:1.0 |
| Pitch No. 2: | | | | | |
| Free fatty acid (as oleic), percent | 26.4 | 0.0 | 0.1 | 0.3 | 0.5 |
| Acid value | 32.5 | | | | |
| Saponification number | 139.0 | | | | |
| Iodine value | 34.1 | | | | |
| Unsaponifiable, percent | 16.8 | | | | |

| | | After adducting with ethylene oxide in weight ratio of 1 part pitch to ½ part EtO ² | |
|---|---|---|---|
| | | 1st reactor batch | 2nd reactor batch |
| Pitch No. 3: | | | |
| Free fatty acid (as oleic), percent | 26.1 | 4.1 | 1.9 |
| Acid value | 54.4 | 8.5 | 3.7 |

¹ Pitch numbers 1 and 2 were adducted with ethylene oxide in a "Laboratory Scale" Reactor.
² Pitch number 3 was adducted with ethylene oxide in "Commercial Plant Production."
NOTE.—Pitch numbers 2 and 3 were diluted with a heavy aromatic naphtha in weight ratios of 75% pitch and 25% Exosol before being adducted with EtO. Analyses on these materials were corrected to the 100% active basis.

EXAMPLE VI

Emulsions were prepared containing equal quantities of diesel oil and saturated salt water emulsified by the use of 15 pounds per barrel of a number of different cottonseed pitches and 7 pounds per barrel of magnesium oxide, in order to test the effect of the acid value of the emulsifier on the characteristics of the emulsion. The following results were obtained.

*Table No. 6*

| Sample identification | 25-OSP | NATX 5075 | ISTX 1261 | 55G | 6-OSP |
|---|---|---|---|---|---|
| Acid value ¹ | 58.9 | 54.4 | 48.8 | 32.5 | 24.2 |
| Free fatty acid, percent | 29.6 | 26.1 | 24.5 | 26.4 | 33.1 |
| Saponification value | 128.9 | 127.1 | 134.4 | 139.0 | 112.2 |
| Unsaponifiables, percent | 17.9 | 15.6 | 20.4 | 16.8 | 24.5 |
| Base Emulsion: | | | | | |
| Stability | 210 | 150 | 150 | 150 | 150 |
| Apparent viscosity | 44 | 44 | 39 | 45 | 36 |
| Gel strength (0'/10') | 16/30 | 13/22 | 10/15 | 12/20 | 1/1 |
| Fluid loss, cc. (30 minutes) | ² 0.1 | 0.0 | ² 0.1 | ² 0.1 | 0.0 |
| Weighted to 12 lb/gal: | | | | | |
| Stability | 315 | 285 | 255 | 195 | 180 |
| Apparent viscosity | 93 | 84 | 84 | 71 | 65 |
| Gel strengths (0'/10') | 13/31 | 14/40 | 8/31 | 8/29 | 2/3 |
| Added 25 lb./bbl. bentonite: | | | | | |
| Stability | 270 | 240 | 240 | 210 | 160 |
| Apparent viscosity | 113 | 103 | 110 | 91 | 75 |
| Gel strengths (0'/10') | 20/55 | 18/57 | 17/56 | 13/44 | 2/2 |
| Aged static 16 hrs. at 250° F.: | | | | | |
| Stability | 390/300 | 330/315 | 390/285 | 255/280 | 255/195 |
| Apparent viscosity | 108 | 115 | 109 | 81 | 69 |
| Gel strengths (0'/10') | 21/40 | 23/73 | 18/46 | 18/63 | 5/13 |
| Fluid loss, cc. (30 min.) | 0.0 | 0.0 | 0.0 | 0.0 | 0.0 |

¹ Acid value determined according to ASTM Designation: D974-55T or D664-54 adapted.
² Oil.

EXAMPLE VII

In order to compare the effect of a constant weight of various quaternary ammonium surfactants on the properties of invert emulsions, a series of emulsions were made and their properties were determined. Each emulsion contained equal volumes of diesel oil and saturated salt water, 18 pounds per barrel of Concentrate A, and 2 pounds per barrel of Concentrate B prepared from different surfactants. The following results were obtained:

*Table No. 7*

|  | Cationic surfactants | | | |
| --- | --- | --- | --- | --- |
|  | 4 | 6 | 21 | 26 |
| Stability, minutes: | | | | |
| 5 | 210 | 180 | 180 | 150 |
| 10 | 180 | 180 | 150 | 150 |
| 25 | 180 | 150 | 180 | 150 |
| Apparent viscosity | 42 | 40 | 36 | 41 |
| Gel strengths (0'/10') | 3/12 | 2/3 | 5/18 | 2/10 |
| Weighted to 12 lb./gal.: | | | | |
| Stability | 330 | 330 | 360 | 330 |
| Apparent viscosity | 65 | 65 | 65 | 64 |
| Gel strength (0'/10') | 3/14 | 2/4 | 3/10 | 1/8 |
| Added 25 lb./bbl. bentonite: | | | | |
| Stability | 210 | 180 | 210 | 240 |
| Apparent viscosity | 77 | 82 | 75 | 77 |
| Gel strength (0'/10') | 4/25 | 3/16 | 3/20 | 2/19 |
| Aged static 16 hrs. at 250° F.: | | | | |
| Stability | 300/360 | 300/330 | 330/300 | 330/300 |
| Apparent viscosity | 150 | 147 | 137 | 136 |
| Gel strength (0'/10') | 70/116 | 76/128 | 70/130 | 72/128 |

|  | 400 | 221 | H226 | 336 |
| --- | --- | --- | --- | --- |
| Stabilities, minutes: | | | | |
| 5 | 150 | 150 | 210 | 180 |
| 10 | 150 | 150 | 210 | 180 |
| 25 | 150 | 180 | 210 | 150 |
| Apparent viscosity | 38 | 31 | 35 | 30 |
| Gel strengths (0'/10') | 2/10 | 1/6 | 2/5 | 2/5 |
| Weighted to 12 lb./gal.: | | | | |
| Stability | 300 | 240 | 180 | 240 |
| Apparent viscosity | 59 | 62 | 61 | 61 |
| Gel strengths (0'/10') | 3/5 | 2/7 | 2/7 | 2/8 |
| Added 25 lb./bbl. bentonite: | | | | |
| Stability | 180 | 150 | 150 | 150 |
| Apparent viscosity | 81 | 77 | 67 | 76 |
| Gel strengths (0'/10') | 4/15 | 3/10 | 2/10 | 2/12 |
| Aged Static 16 hrs. at 250° F.: | | | | |
| Stability | 300/330 | 240/270 | 240/270 | 240/270 |
| Apparent viscosity | 133 | 137 | 124 | 122 |
| Gel strengths (0'/10') | 73/135 | 67/101 | 74/108 | 68/131 |

DESCRIPTION

Cationic surfactant No.:
- 4 — Lauryl trimethyl ammonium chloride.
- 6 — Palmityl trimethyl ammonium chloride.
- 21 — Coco trimethyl ammonium chloride.
- 26 — Monotallow trimethyl ammonium chloride.
- 400 — 1:1 mixture cationic surfactant 26 and 221.
- 221 — Dicoco dimethyl ammonium chloride.
- H226 — Dihydrogenated tallow dimethyl ammonium chloride.
- 336 — Tricaprylyl monomethyl ammonium chloride.

CARBON CHAIN LENGTH

Cationic surfactant No.:
- 4 — 12.
- 6 — 14.
- 21 — $C_8$–$C_{18}$ ($C_{12}$ predominating).
- 26 — 70% $C_{18}$, 30% $C_{16}$.
- 400 — ——.
- 221 — $C_8$–$C_{18}$ ($C_{12}$ predominating).
- H226 — 70% $C_{18}$, 30% $C_{16}$.
- 336 — $C_8$–$C_{10}$ ($C_8$ predominating).

AVERAGE MOLECULAR WEIGHT

Cationic surfactant No.:
- 4 — 263
- 6 — 346
- 21 — 296
- 26 — 364
- 400 — 467
- 221 — 432
- H226 — 570
- 336 — 442

EXAMPLE VIII

The comparative effect of the use of various quaternary ammonium surfactants on the characteristics of the invert emulsions was studied by the preparation of emulsions from equal quantities of diesel oil and saturated salt water containing 11 pounds per barrel of cottonseed pitch and 13 pounds per barrel of a material consisting of 30.8 percent attapulgite, 15.4 percent of one of the cationic surfactants, and 53.8 percent of magnesium oxide. The following results were obtained:

*Table No. 8*

|  | Cationic surfactant | | | | | |
| --- | --- | --- | --- | --- | --- | --- |
|  | 5 | 7 | 15 | 21 | 205 | 207 |
| Base emulsion: | | | | | | |
| Stability | 120 | 150 | 135 | 120 | 135 | 120 |
| Apparent viscosity | 35 | 35 | 35 | 37 | 36 | 31 |
| Gel strengths (0'/10') | 2/4 | 4/9 | 3/7 | 2/4 | 4/9 | 2/3 |
| Fluid Loss,[1] cc. (30 min.) | 0.1 | 0.0 | 0.0 | 0.0 | 0.0 | 0.0 |
| Weighted to 12 lb./gal.: | | | | | | |
| Stability | 210 | 225 | 225 | 225 | 180 | 180 |
| Apparent viscosity | 70 | 70 | 73 | 73 | 71 | 64 |
| Gel strengths (0'/10') | 3/8 | 3/12 | 3/12 | 3/8 | 4/14 | 4/7 |
| Added 25 lb./bbl. bentonite: | | | | | | |
| Stability | 195 | 225 | 225 | 195 | 180 | 180 |
| Apparent viscosity | 80 | 83 | 76 | 77 | 84 | 80 |
| Gel strengths (0'/10') | 3/13 | 3/18 | 3/16 | 3/13 | 7/24 | 3/10 |
| Aged static 16 hrs. at 250° F.: | | | | | | |
| Stability | 300/240 | 270/225 | 285/240 | 285/255 | 255/225 | 225/210 |
| Apparent viscosity | 70 | 78 | 74 | 79 | 80 | 74 |
| Gel strengths (0'/10') | 5/20 | 3/14 | 4/14 | 3/17 | 9/26 | 4/11 |
| Fluid loss,[1] cc. (30 min.) | 0.0 | 0.0 | 0.0 | 0.0 | 1.0 | 0.0 |
| Aged static 47 hrs. at 300° F.: | | | | | | |
| Stability | -------- | 90/165 | 90/150 | 60/135 | -------- | -------- |
| Apparent viscosity | -------- | 73 | 70 | 70 | -------- | -------- |
| Gel strengths (0'/10') | -------- | 9/30 | 7/26 | 4/16 | -------- | -------- |
| Fluid loss,[1] cc. (30 min.) | -------- | 1.4 | 1.8 | 1.0 | -------- | -------- |
| Aged static 16 hrs. at 350° F.: | | | | | | |
| Stability | -------- | -/165 | -/150 | -/180 | -------- | -------- |
| Gel strengths (0'/10') | -------- | 4/18 | 4/16 | 4/20 | -------- | -------- |
| Fluid loss,[1] cc. (30 min.) | -------- | 2.0 | 1.8 | 2.4 | -------- | -------- |
| Apparent viscosity | -------- | 75 | 77 | 70 | -------- | -------- |

[1] Fluid Loss shown above is oil.

DESCRIPTION OF QUATERNARY AMMONIUM SURFACTANTS IN TABLE NO. 8

Cationic surfactant No.:
- 5 — Myristyl trimethyl ammonium chloride.
- 7 — Stearyl trimethyl ammonium chloride.
- 15 — Oleyl-linoleyl trimethyl ammonium chloride.
- 21 — Coco trimethyl ammonium chloride.
- 205 — Dimyristyl dimethyl ammonium chloride.
- 207 — Distearyl dimethyl ammonium chloride.

Table No. 9

| | Cationic surfactants | | | | | |
|---|---|---|---|---|---|---|
| | 21 | 221 | 721 | 26 | 726 | 336 |
| Base emulsion: | | | | | | |
| Stability | 120 | 165 | 120 | 105 | 105 | 120 |
| Apparent viscosity | 37 | 39 | | | | |
| Gel strengths (0'/10') | 4/- | 4/- | | | | |
| Fluid loss,[1] cc. (30 minutes) | 0.0 | 0.0 | | | | |
| Weighted to 12 lb./gal.: | | | | | | |
| Stability | 195 | 180 | 195 | 150 | 180 | 180 |
| Apparent viscosity | | | | | | |
| Gel strengths (0'/10') | | | | | | |
| Added 25 lb./bbl. bentonite | | | | | | |
| Stability | 210 | 195 | 195 | 195 | 120 | 150 |
| Apparent viscosity | 68 | 80 | | 66 | 61 | 72 |
| Gel strengths (0'/10') | 4/- | 7/- | | 4/- | 2/- | 2/3 |
| Aged static 48 hrs. at 300° F.: | | | | | | |
| Stability | 60/150 | 75/165 | 60/135 | 30/150 | 75/150 | 45/105 |
| Apparent viscosity | 72 | 73 | 68 | 72 | 68 | 55 |
| Gel strengths (0'/10') | 4/9 | 8/23 | 3/11 | 6/21 | 4/12 | 2/4 |
| Fluid loss,[1] cc. (30 min.) | 0.0 | [2]5.4 / 6.6 | 0.1 | 1.0 | 0.8 | [2]1.5 / 3.5 |

[1] The fluid loss shown is oil unless otherwise specified.
[2] Water.

Quaternary ammonium surfactant:
- 21 — Coco trimethyl ammonium chloride.
- 221 — Dicoco dimethyl ammonium chloride.
- 721 — N-coco, N-N-dimethyl, N'-N'-N'-trimethyl-1, 3-propylene diammonium chloride.
- 26 — Tallow trimethyl ammonium chloride.
- 726 — N-tallow, N,N-dimethyl, N'-N'-N'-trimethyl-1, 3-propylene diammonium chloride.
- 336 — Tricaprylyl monomethyl ammonium chloride.

EXAMPLE IX

The effects of attapulgite, Wyoming bentonite and talc in thickening diesel oil was compared with mixtures of 300 cubic centimeters of diesel oil with 72 grams of solid material for a period of five minutes on a Hamilton Beach mixer at 110 volts, followed by the introduction of 36 grams of coco trimethyl ammonium chloride and continuing mixing for twenty-five additional minutes. The following results were obtained.

Table No. 10

INITIAL PROPERTIES

| Solid used | Apparent Viscosity | Gel Strengths (0'/10') |
|---|---|---|
| Attapulgite | 125 | 77/85 |
| Wyoming bentonite | 13 | 5/11 |
| Talc | 4 | 1/1 |

AFTER TWO HOURS

| Solid used | Apparent Viscosity | Gel Strengths (0'/10') |
|---|---|---|
| Attapulgite | [1]50 | 25/25 |
| Wyoming bentonite | 17 | 3/10 |
| Talc | 9 | 2/2 |

[1] Sample appeared to be much thicker than indicated on meter. Rotor probably slipping through this grease-like substance and not indicating true viscosity.

| Solid used | Apparent viscosity | Viscosity | Yield point | Gel strength (0'/10') | Oil breakout | Settling |
|---|---|---|---|---|---|---|
| Attapulgite | 47 | 20 | 54 | 16/16 | Trace | None. |
| Wyoming bentonite | 33 | 20 | 26 | 16/20 | 15 cc. | None. |
| Talc | 16 | 16 | 0 | 2/2 | All solids settled to bottom | |

EXAMPLE X

High temperature-high pressure fluid loss characteristics of emulsions prepared from equal volumes of oil and saturated salt water by the use of the combination of Concentrate A and B were determined, and compared with the results obtained by the addition of fluid loss preventing materials to the emulsion. The following results were obtained:

Table No. 11

| Emulsifiers | 212° F. | | | | | |
|---|---|---|---|---|---|---|
| Concentrate A, lb/bbl | 18 | 24 | 18 | 0 | 18 | 18 |
| Concentrate B, lb/bbl | 6 | 9 | 9 | 9 | 9 | 6 |
| Other agents, lb/bbl | | | [1]1 | [2]18 | [3]5 | [4]5 |
| | 250° F. | | | | | |
| Concentrate A, lb/bbl | 18 | | 18 | | | |
| Concentrate B, lb/bbl | 6 | | 6 | | | |
| Other agents, lb/bbl | | | 5 | | | |
| Base emulsion | 212° F. | | | | | |
| Stability | 195 | 255 | 180 | 90 | 240 | 285 |
| Apparent viscosity | 64 | 55 | 53 | 32 | 73 | 78 |
| Gel strength (0'/10') | 35/49 | 30/35 | 27/32 | 1/3 | 53/58 | 46/- |
| Fluid loss, oil, cc. at 500 p.s.i.g. | 1.4 | 0.5 | 1.8 | 1.0 | 0.6 | 1.0 |
| | 250° F. | | | | | |
| Stability | 195 | 285 | | | | |
| Apparent viscosity | 64 | 78 | | | | |
| Gel strength (0'/10') | 35/49 | 46/- | | | | |
| Fluid loss, oil, cc. at 500 p.s.i.g. | 1.8 | 1.1 | | | | |

[1] Oleic acid.
[2] Conc. A.
[3] Vinsol resin.
[4] "Jet" Gilsonite.

EXAMPLE XI

The lubricating properties of emulsions prepared with Concentrates A and B were determined by preparing 11 one-barrel equivalents of emulsion in the manner described above using equal volumes of diesel oil and saturated salt water. Eighteen pounds per barrel of Concentrate A and 6 pounds per barrel of Concentrate B were used as emulsifiers. The following results were obtained:

Table No. 12

EXTREME PRESSURE LUBRICATING PROPERTIES OF EMULSIONS PREPARED WITH CONCENTRATES A AND B

The emulsion had the following initial properties:

Electrical stability, volts_____ 240
Apparent viscosity, cps_____ 51
Gel strength (0'/10')_____ 20/27

After the emulsion had aged at room conditions for approximately 20 hours, its extreme pressure lubrication properties were measured on a No. 1750 Timken Lubricant Tester. The following results were shown from these tests:

| Test No. | Temperature, °F. Initial | Temperature, °F. Final | Load (lbs.) | Results | Time (min.) |
|---|---|---|---|---|---|
| 1 | 78 | 100 | 30 | Pass | 10 |
| 2 | 91 | 116 | 40 | do | 10 |
| 3 | 94 | 124 | 60 | Metal build-up-fail | 10 |
| 4 | 122 | 153 | 100 | do | 10 |

| Test No. | Scar Width (mm.) | Scar Nature | Power (kw.) Max. | Power (kw.) Min. |
|---|---|---|---|---|
| 1 | 4.7 | Deep striations | 0.95 | 0.42 |
| 2 | 4.8 | do | 1.13 | 0.50 |
| 3 | 4.8 | Smooth, but metal build-up on edge. | 1.39 | 0.50 |
| 4 | 4.9 | do | 1.85 | 0.70 |

Properties of emulsion after test:

Electrical stability, volts_____ 270
Viscosity apparent, cps_____ 80
(0'/10') gel strength_____ 42/63
Fluid loss, cc. oil, 7½ min_____ 0.1

EXAMPLE XII

The effect of different physical properties of calcined magesite, magnesium carbonate and magnesium hydroxide on the properties of invert emulsions was studied on samples of emulsions prepared from equal quantities of diesel oil and saturated salt water, emulsified with 18 pounds per barrel of Concentrate A and 7 pounds per barrel of magnesium compound. The following table lists the results obtained:

Table No. 13

| | Manufacturer A | | | |
|---|---|---|---|---|
| Calcined magnesite No. | 1-40 | 5 | 15 | 30 |
| Bulk density (lb./ft.³) | 60 | 28 | 24 | 8.5 |
| Iodine value (ml. eq./100 gm.) | 0-3 | 5-10 | 10-18 | 25-40 |
| lb./bbl. Mgo, etc. used | 7 | 7 | 7 | 7 |
| Stabilities, min.: | | | | |
| 5 | 150 | 135 | 135 | 120 |
| 10 | 170 | 165 | 150 | 120 |
| 25 | 225 | 180 | 165 | 165 |
| Apparent viscosity | 91 | 46 | 43 | 44 |
| Gel strength (0'/10') | 56/53 | 25/32 | 3/5 | 13/25 |
| Fluid loss (cc.) | 1.0(O.) / 2.5(E.) | 2.5(O.) | 2.0(E.) | 1.8(O.) |
| Aged static 64 hrs. at 250° F.: | | | | |
| Stability | 20/180 | 70/150 | 90/180 | 90/270 |
| Apparent viscosity | 43 | 49 | 50 | 51 |
| Gel Strength (0'/10') | 16/37 | 17/36 | 24/37 | 24/52 |
| Fluid loss (cc.) | 1.3(O.) | 1.5(O.) | 1.6(O.) | 1.2(O.) |

| | Manufacturer B | | | Manufacturer A | |
|---|---|---|---|---|---|
| Calcined magnesite No. | Synthetic MgO | MgCO₃ | Mg-OH)₂ | MgCO₄ | Mg-OH)₂ |
| Bulk density (lb/ft.³) | 20-25 | 5.5 | 20 | 5.5 | |
| Iodine value (ml. eq./100 gm.) | 1-14 | 15-25 | 10-18 | 15-25 | |
| Lb./bbl. MgO, etc. used | 7 | 7 | 7 | 14 | 15 |
| Stabilities, minutes: | | | | | |
| 5 | 120 | 165 | 165 | | |
| 10 | 135 | 210 | 170 | | |
| 25 | 165 | 225 | 225 | 195 | 255 |
| Apparent viscosity | 46 | 98 | 84 | 88 | 93 |
| Gel strength (0'/10') | 24/38 | 56/69 | 46/46 | 59/78 | 48/62 |
| Fluid loss (cc.) | 2.0(O.) | 2.2(O.) | 1.8(O.) | 2.4(O.) | 2.4(O.) |
| Aged static 64 hrs. at 250° F: | | | | | |
| Stability | 120/180 | 75/120 | 60/135 | 75/180 | 120/210 |
| Apparent viscosity | 49 | 55 | 41 | 50 | 68 |
| Gel strength (0'/10') | 18/34 | 25/41 | 12/24 | 21/48 | 32/61 |
| Fluid loss (cc.) | 1.8(O.) | 2.8(O.) | 2.0(O.) | 1.4(O.) | 2.8(O.) |

EXAMPLE XIII

Invert emulsions were prepared from equal volumes of diesel oil and saturated salt water using 30 pounds of Concentrate A and 15 pounds of Concentrate B per barrel of emulsion. One pound of sodium hydroxide per barrel of emulsion was added to a part of the emulsion, the two samples then being weighted by addition of barium sulfate and aged for an equal length of time under identical conditions to determine the effect of aging. The following results were obtained:

Table No. 14

| Other agents (lb./bbl.) | None | 1NaOH |
|---|---|---|
| Base emulsion: | | |
| Stability | 300 | 330 |
| Apparent viscosity | 62 | 45 |
| Gel strength(0'/10') | 29/46 | 2/3 |
| Weighted to 12 lb/gal: | | |
| Stability | 375 | 390 |
| Apparent viscosity | 107 | 82 |
| Gel strength (0'/10') | 46/85 | 6/14 |
| Aged static 114 hours at 250° F: | | |
| Stability | 0/300 | 0/255 |
| Apparent viscosity | 81 | 56 |
| Gel strength (0'/10') | 27/47 | 4/8 |
| Fluid loss (cc.) | [1] 0.1 | 0.0 |
| Oil breakout (cc.) | 75 | 110 |
| Settling of barite (percent) | None | [2] 40 |

[1] Oil.
[2] Hard settling.

EXAMPLE XIV

One thousand thirty-three barrels of the invert emulsion well fluid of this invention were prepared for experimental use in a well. In addition to the usual qualities desirable in well fluids, it was found that these invert emulsions had extremely high lubricity.

Since the equipment used for the preparation of this material consisted of one 100-barrel tank with three mixing guns, having one-half inch jet nozzles, the following procedure was used:

(1) Fifty-seven barrels of 32 gravity diesel oil were introduced into the tank.

(2) Four drums of Concentrate A, described above, were added to the diesel oil and thoroughly mixed for a period of about 5 to 10 minutes.

(3) Fifteen barrels of salt water containing about 250,000 parts per million of salt were added and mixing was continued with pump pressure at 500 p.s.i. for 30 minutes.

(4) Fifteen additional barrels of salt water were added and mixed for 30 minutes.

(5) Eight 50-pound sacks of Concentrate B were added and mixed for 15 minutes.

(6) Seventy-five sacks of barite were added to obtain the desired mud weight and the whole was mixed for a period of 2 hours.

The final volume of materials introduced was as follows:

| | Barrels |
|---|---|
| Diesel oil | 57 |
| Salt water | 30 |
| Concentrate A | 5¼ |
| Concentrate B | ¼ |
| Barite | 5 |

The total volume of this mixture of materials was 97.5 barrels. Similar procedures were employed until the required amount of invert emulsion was prepared.

At this time the well had a depth of 6,657 feet. Twenty barrels of diesel oil were introduced into the drill pipe ahead of the invert emulsion to act as a cushion between the emulsion and the well fluid in drilling to this depth. One hour was required to displace the previously used drilling fluid and approximately 575 barrels of invert emulsion were required for this displacement. The viscosity of the invert emulsion was a bit high after the first circulation and 40 barrels of diesel oil were added and mixed very thoroughly therewith to reduce the viscosity. The well was drilled 1,729 feet deeper in very hard formation and under drilling conditions so difficult that a total of 17 drill bits were used in penerating through the 1,729 feet of hard formation. It was observed that all drill bits were well worn with thoroughly dulled teeth, but the bearings on all bits brought to the surface for changes were found to be in good condition due to the very high degree of lubricity of the mud. The average rate of penetration was 16 feet per hour, which is exceptionally high for this particular type of formation and a representative of the major oil company believes it to be the highest rate of penetration ever attained. The well hole remained very stable and apparently in gage throughout the drilling. The mud remained remarkably stable even though the mixing pressure was low and at a depth of 8,314 feet, the mud had a funnel viscosity of 100 seconds per quart, weight at 74 pounds per cubic foot, gel strength at 5/20, stability at 220 and contained 57 percent oil, 33 percent water, and 10 percent solids.

From the foregoing it will be seen that this invention is one well adapted to attain all of the ends and objects hereinabove set forth, together with other advantages which are obvious and which are inherent to the process and composition of matter.

It will be understood that certain features and subcombinations are of utility and may be employed without reference to other features and subcombinations of the invention. This is contemplated by and is within the scope of the claims.

As many possible embodiments may be made of the invention, without departure from the scope thereof, it is to be understood that all matter herein set forth is to be interpreted as illustrative and not in a limiting sense.

The invention having been described, what is claimed is:

1. An invert emulsion well fluid comprising about 10 to 90 volume percent of an aqueous phase dispersed in about 90 to 10 percent of oil phase; a polymerized polybasic fatty acid pitch, and an adduct made by adducting polymerized polybasic fatty acid pitch with about ¼ to ¾ its weight of ethylene oxide, in proportion equivalent to about 5 to 75 percent of the total weight of the pitch and adduct, said pitch and adduct being present in quantity sufficient to emulsify the phases; tall oil to an extent of about 5 to 10 percent of the total weight of pitch and adduct; a basic material selected from the group consisting of magnesium oxide, magnesium hydroxide and magnesium carbonate, in quantity sufficient to form soaps with all free fatty acids present; and about 0.03 to 1.6 pounds per barrel of a salt of a tetra alkyl substituted ammonium radical in which at least one of the alkyl groups is a hydrocarbon residue of a fatty acid having from 8 to 18 carbon atoms per molecule adsorbed on about 4 to 8 times its weight of attapulgite.

2. The well fluid of claim 1 wherein the aqueous phase consists essentially of sea water.

3. The well fluid of claim 1 wherein the aqueous phase comprises an aqueous drilling mud.

4. An invert emulsion well fluid comprising about 30 to 70 volume percent of aqueous phase dispersed in about 70 to 30 percent of oil phase and containing about 5 to 8¼ pounds per barrel of polymerized polybasic fatty acid pitch; a pitch-adduct made by adducting the pitch with 40 to 60 percent of its weight of ethylene oxide, said adduct being present to the extent of about 25 to 50 percent of the total weight of pitch and adduct; tall oil in quantity from 5 to 10 percent of the total weight of pitch and adduct; about 0.75 to 15.5 pounds per barrel of magnesium oxide; and about 0.03 to 1.6 pounds per barrel of a salt of a tetra alkyl substituted ammonium radical in which at least one of the alkyl groups is a hydrocarbon residue of a fatty acid having from 8 to 18 carbon atoms per molecule in intimate admixture with about 4 to 8 times its weight of attapulgite.

5. An invert emulsion well fluid comprising about 30 to 70 volume percent of salt water phase dispersed in about 70 to 30 percent of petroleum oil phase and containing about 5 to 10 pounds per barrel of polymerized polybasic fatty acid pitch; a pitch-adduct made by adducting the pitch with about ¼ to ¾ its weight of ethylene oxide, said adduct being present in proportion to furnish about 5 to 75 percent of the total weight of pitch and adduct; tall oil in an amount equivalent to about 5 to 10 percent of the total weight of pitch and adduct; magnesium oxide in quantity at least sufficient to form magnesium soaps with all fatty acids present; about 0.03 to 1.6 pounds per barrel of a material selected from the group consisting of lauryl trimethyl ammonium chloride, palmityl trimethyl ammonium chloride, coco trimethyl ammonium chloride, monotallow trimethyl ammonium chloride, dicoco dimethyl ammonium chloride, dihydrogenated tallow dimethyl ammonium chloride, tricaprylyl monomethyl ammonium chloride, myristyl trimethyl ammonium chloride, oleyl-lineoleyl trimethyl ammonium chloride, stearyl trimethyl ammonium chloride, dimyristyl dimethyl ammonium chloride, and distearyl ammonium chloride, in intimate admixture with about 4 to 8 times its weight of attapulgite.

6. An invert emulsion well fluid comprising about 30 to 70 volume percent of a salt water phase dispersed in about 70 to 30 percent of refined petroleum oil phase and containing about 5 to 8¼ pounds per barrel of vegetable pitch; a pitch-adduct made by adducting the pitch with about 40 to 60 percent of its weight of ethylene oxide, said adduct being present in proportion of about 25 to 50 percent of the total weight of pitch and adduct; tall oil in an amount corresponding to about 5 percent of the total weight of pitch and adduct; about 0.75 to 30.0 pounds per barrel of magnesium oxide; and about 0.03 to 1.6 pounds per barrel of a material selected from the group consisting of lauryl trimethyl ammonium chloride, palmityl trimethyl ammonium chloride, coco trimethyl ammonium chloride, monotallow trimethyl ammonium chloride, dicoco dimethyl ammonium chloride, dihydrogenated tallow dimethyl ammonium chloride, tricaprylyl monomethyl ammonium chloride, myristyl trimethyl ammonium chloride, oleyl-lineoleyl trimethyl ammonium chloride, stearyl trimethyl ammonium chloride, dimyristyl dimethyl ammonium chloride, and distearyl ammonium chloride in intimate admixture with about 0.15 to 6.0 pounds per barrel of attapulgite.

7. An invert emulsion well fluid comprising about 30 to 70 volume percent of a salt water phase dispersed in about 70 to 30 percent of refined petroleum oil phase and containing about 5 to 8¼ pounds per barrel of vegetable pitch having a free fatty acid content of at least 23 percent; a pitch-adduct made by adducting the pitch with about one-half its weight of ethylene oxide, said adduct being present in proportion of about 5 to 75 percent of the total weight of pitch and adduct; tall oil in an amount equivalent to about 5 to 10 percent of the total weight of pitch and adduct; about 0.75 to 15.5 pounds per barrel of magnesium oxide; and about 0.035 to 0.4 pound per barrel of coco trimethyl ammonium chloride in intimate admixture with about 0.15 to 3.0 pounds per barrel of attapulgite.

8. A process for preparing an invert emulsion well fluid which comprises introducing a petroleum oil, a polymerized polybasic fatty acid pitch, an adduct made by adducting the pitch with from ¼ to ¾ its weight of ethylene oxide, tall oil, water, a basic material selected from the group consisting of magnesium oxide, magnesium hydroxide, and magnesium carbonate, and a salt of a tetra alkyl substituted ammonium radical in which at least one of the alkyl groups is a hydrocarbon residue of a fatty acid having from 8 to 18 carbon atoms per molecule in intimate admixture with 4 to 8 times its weight of attapulgite into an emulsification zone; controlling the quantities of materials introduced so that a resulting emulsion contains from 10 to 90 volume percent of aqueous phase dispersed in 90 to 10 percent of oil phase, pitch and pitch-adduct in amounts sufficient to emulsify the phases, the ratio between pitch and pitch-adduct is in the range from 5 to 75 percent of the total weight of pitch and adduct, the weight of tall oil is in the range from 5 to 10 percent of the total weight of pitch and adduct, the proportion quaternary ammonium surfactant is in the range from 0.03 to 1.6 pounds per barrel of finished emulsion; the basic magnesium material is introduced in quantity at least sufficient to form magnesium soap with all free fatty acids present; and agitating said materials in the emulsification zone until an invert emulsion is formed.

9. A process for preparing an invert emulsion well fluid which comprises introducing salt water into an emulsifying zone in quantity sufficient to form 30 to 70 volume percent of an emulsion to be produced; therein overlaying said water with sufficient petroleum oil to form 70 to 30 volume percent of oil phase in said emulsion; adding to and dissolving in said petroleum oil a polymerized polybasic fatty acid pitch in quantity to give from 5 to 10 pounds per barrel of finished emulsion, a pitch-adduct, made by adducting the pitch with about ¼ to ¾ its weight of ethylene oxide, in proportion to furnish about 5 to 75 percent of the total weight of pitch and adduct, tall oil in an amount equivalent to about 5 to 10 percent of the total weight of pitch and adduct; agitating the water and oil until an emulsion begins to form; and continuing agitation while adding magnesium oxide in quantities at least sufficient to form magnesium soaps with all free fatty acids present and about 0.03 to 1.6 pound per barrel of finished emulsion of a salt of a tetra alkyl substituted ammonium radical in which at least one of the alkyl groups is a hydrocarbon residue of a fatty acid having from 8 to 18 carbon atoms per molecule in intimate admixture with about 4 to 8 times its weight of attapulgite.

10. A process for producing an invert emulsion well fluid which comprises introducing into an emulsifying zone a sufficient quantity of water to form from 10 to 90 volume percent of an aqueous phase in an emulsion to be produced; introducing upon the water in said emulsifying zone a petroleum oil in quantity to form from 90 to 10 volume percent of an oil phase; mixing with the petroleum oil an effective amount of an emulsifier solution containing a vegetable pitch, a pitch-adduct made by adducting the pitch with ¼ to ¾ its weight of ethylene oxide, said adduct being present in proportion of about 25 to 50 percent of the total weight of pitch and adduct; tall oil in proportion from about 5 to 10 percent of the total weight of pitch and adduct and an oil miscible solvent in quantity sufficient to dissolve said pitch, adduct and tall oil; agitating the oil and water; and adding as an emulsion forms a salt of a tetra alkyl substituted ammonium radical in which at least one of the alkyl groups is a hydrocarbon residue of a fatty acid having from 8 to 18 carbon atoms per molecule in intimate admixture with from 4 to 8 times its weight of attapulgite and magnesium oxide in quantity at least sufficient to form magnesium soaps with all free fatty acids present.

11. A process for producing invert emulsion well fluid which comprises introducing sufficient quantity of water into an emulsifying zone to form from 10 to 90 volume percent of aqueous phase in a resulting emulsion; introducing a quantity of a petroleum oil sufficient to form from 90 to 10 percent of an oil phase in an emulsion into the emulsifying zone upon said water; mixing with said petroleum oil from 15 to 25 pounds of emulsifier solution per barrel of emulsion, said solution containing about 33 percent vegetable pitch, about 25 percent of a pitch-adduct made by adducting the pitch with from ¼ to ¾ its weight of ethylene oxide, about 3 percent of tall oil, and about 39 percent of a heavy aromatic naphtha; agitating the oil and water in the emulsifying zone until an emulsion begins to form; adding thereto from 1 to 20 pounds per barrel of a dry-free-flowing powder containing about 3.5 to 4.0 percent of a salt of a tetra alkyl substituted ammonium radical in which at least one of the alkyl groups is a hydrocarbon residue of a fatty acid having from 8 to 18 carbon atoms per molecule in intimate admixture with about 15 percent of attapulgite and about 77 percent of magnesium oxide; and continuing agitation of the oil and water until an invert emulsion is formed.

12. The process of claim 11 wherein from 17 to 25 pounds per barrel of the pitch-adduct-tall oil solution is added to the oil and about 12 to 20 pounds per barrel of the dry free-flowing powder is added during agitation.

13. A concentrated emulsifying material for producing invert emulsion well fluid which comprises a vegetable pitch; a pitch-adduct made by adducting the pitch with about ¼ to ¾ its weight of ethylene oxide, said adduct being present in proportion of about 25 to 50 percent of the total weight of pitch and adduct; tall oil in proportion of about 5 to 10 percent of the total weight of pitch and adduct; and sufficient oil miscible solvent to maintain the pitch-adduct and tall oil in solution.

14. A concentrated emulsifying material for the production of invert emulsion well fluid which comprises about 33 percent of vegetable pitch, about 25 percent of a pitch-adduct made by adducting the pitch with about 25 to 75 percent of its weight of ethylene oxide, about 3 percent of tall oil, and about 39 percent of a heavy aromatic naphtha.

15. A process for the recovery of cores in substantially native state which comprises introducing into a well an invert emulsion well fluid containing about 10 to 90 percent of aqueous phase dispersed in from 90 to 10 percent of oil phase and further containing per barrel of emulsion about 5 to 8¼ pounds of vegetable pitch, and about 3 to 6¼ pounds of vegetable pitch-adduct made by adducting the pitch with about ¼ to ¾ its weight of ethylene oxide, about 0.4 to 0.75 pound of tall oil, about 0.034 to 0.7 pound of a salt of a tetra alkyl substituted ammonium radical in which at least one of the alkyl groups is a hydrocarbon residue of a fatty acid having from 8 to 18 carbon atoms per molecule in intimate admixture with about 0.15 to 3.0 pounds of attapulgite, said emulsion further containing magnesium oxide in quantity at least sufficient to form magnesium soaps with all free fatty acids present; cutting a core from a stratum in the presence of said invert emulsion well fluid and removing the core from the well.

16. A process for the rotary drilling of wells which comprises introducing into a well an invert emulsion well fluid of high lubricity containing from about 10 to 90 percent of aqueous phase dispersed in from about 90 to 10 percent of oil phase and further containing about 5 to 8¼ pounds of vegetable pitch per barrel of emulsion, and about 3 to 6¼ pounds of vegetable pitch-adduct made by adducting the pitch with about ¼ to ¾ its weight of ethylene oxide, about 0.4 to 0.75 pounds of tall oil, about 0.034 to 0.7 pound of a salt of a tetra alkyl substituted ammonium radical in which at least one of the alkyl groups is a hydrocarbon residue of a fatty acid having from 8 to 18 carbon atoms per molecule in intimate admixture with about 0.15 to 3.0 pounds of attapulgite, said emulsion further containing magnesium oxide in quantity at least sufficient to form magnesium soaps with all free fatty acids present; rotary drilling in the presence of said invert emulsion at a high rate of bit penetration; and lubricating moving parts in said well for a high degree of lubricity provided by said fluid.

References Cited in the file of this patent

UNITED STATES PATENTS

| | | |
|---|---|---|
| 2,497,398 | Dawson | Feb. 14, 1950 |
| 2,661,334 | Lummus | Dec. 1, 1953 |
| 2,698,833 | Wilson | Jan. 4, 1955 |
| 2,862,881 | Reddie | Dec. 2, 1958 |
| 2,885,358 | Reddie | May 5, 1959 |
| 2,999,063 | Hoeppel | Sept. 5, 1961 |
| 3,006,845 | Van Dyke et al. | Oct. 31, 1961 |

FOREIGN PATENTS

| | | |
|---|---|---|
| 578,341 | Canada | June 23, 1959 |